March 24, 1964 H. ROSENBERG 3,126,547

MAGNETIC RECORDING

Filed Aug. 31, 1959 3 Sheets-Sheet 1

INVENTOR.
HARVEY ROSENBERG
BY James J. Wood
ATTORNEY

March 24, 1964 H. ROSENBERG 3,126,547

MAGNETIC RECORDING

Filed Aug. 31, 1959 3 Sheets-Sheet 2

INVENTOR.
HARVEY ROSENBERG
BY James J. Wood
ATTORNEY

INVENTOR.
HARVEY ROSENBERG
BY
James J. Wood
ATTORNEY

United States Patent Office 3,126,547
Patented Mar. 24, 1964

3,126,547
MAGNETIC RECORDING

Harvey Rosenberg, Drexel Hill, Pa., assignor to Burroughs Corporation, Detroit, Mich., a corporation of Michigan Filed Aug. 31, 1959, Ser. No. 837,080
10 Claims. (Cl. 346—74)

This invention relates to magnetic recording, and more specifically to an improved method and improved apparatus for digital recording on a magnetic medium.

In prior art digital recording the magnetizable medium is driven to saturation in either one of two possible directions. The two techniques commonly employed are: (*a*) return-to-zero (RZ) and (*b*) non-return to zero (NRZ). In the return-to-zero technique, one state of saturation is nominated the binary digit "ONE," while the other state of saturation represents the binary digit "ZERO." After a "1" has been stored, the magnetic medium is immediately returned to the ZERO state. It should be noted that the zero here referred to is binary "ZERO," and not the zero state of magnetization. In the non-return to zero method, the direction of magnetization is reversed each time a change occurs from "ONE'S" to a "ZERO," or "ZERO'S" to a ONE. It should be carefully noted that with both these methods the recording medium is always left in a saturated state. The readback signal amplitude is thus a function of the total change in flux $+\varphi r$ to $-\varphi r$ or $/2\varphi r/$.

Generally speaking, accuracy is of greater importance in digital recording than it is in analog recording, i.e., lost or spurious pulses cannot be tolerated. In one area involving the mechanizaiton of banking problems, for example, where digital recording is used extensively, the magnetic media comprises stripes arranged in a plurality of columns on the back of ledger cards. The information, recorded in binary bit form, includes the account number, the present balance and other intelligence of interest to the banker and his client. The magnetic stripe may constitute a very noisy medium, as a result of various surface defects such nodules or clusters of oxide particles which protrude above the surface, and voids and scratches arising from personnel handling the items or documents, and in addition because of defects in manufacture. These surface imperfections result in background noise during readback by causing spurious flux changes not representative of the signal, which changes are detected by the read-head. In worst case system read-write tests, the signal to noise ratio was found to be as low as 4 to 1 with some stripes.

In the RZ and NRZ techniques of the prior art, the magnetic material is in the maximum remanent state $+\varphi r$ or $-\varphi r$ and hence, it is more vulnerable to noise. In the improved digital recording technique of the instant invention, which will be identified as the return to frequency system, the magnetic medium is substantially demagnetized to the zero remanent state. A high frequency signal (having a recorded wavelength on the magnetic medium equal to or smaller than the air gap in the read-head) is utilized for erasing, so that upon completion of this operation, the very small flux which remains cannot be detected by the read-head. The substantially zero magnetic remanent state of the material renders it less less vulnerable to noise. For example, a void or scratch in the magnetic stripe on a ledger card exposes the paper or material upon which it is printed. Since the paper or similar material is magnetically neutral, in transversing from the erased magnetic material to a void there will be little or no change in flux since the magnetic material is in the zero remanent state. This technique of the present invention does result in some loss of signal but the overall signal to noise ratio is so much improved as to provide superior performance over the NRZ and RZ techniques of the prior art. Both these latter methods derive a signal from a flux change of $/2\varphi r/$, while the present invention derives its signal from one-half this change or $/\varphi r/$. In one practical test, the signal to noise ratio of the prior art methods was 80:20; with the teachings of the present invention, the signal to noise ratio was 40:1—a net signal to noise improvement of 10:1.

The improved method of digital recording on a magnetic medium in accordance with the instant invention, comprises the steps of applying a high frequency erasing current to an electromagnetic erase-write head member, and then applying a D.C. signal to the said erase-write head member to record a binary bit on the medium. The high frequency current has a recorded wavelength equal to or less than the length of the air gap in the electromagnetic read-head.

The method may be further improved by applying the D.C. signal to the erase-write head in predetermined synchronized relationship with the high frequency erasing current.

The improved digital recording apparatus of the instant invention comprises an electromagnetic erase-write head which includes an inductance member, an adjustable resistor in series with one end of the said inductance member, the free end of said adjustable resistor being adapted to receive a D.C. write signal source, a capacitor selected to resonate with the inductance member, the other end of said inductance member being connected to the capacitor, means for generating a high frequency current, said latter means being in series with said capacitor, and means for bringing said other end of the inductance member to ground potential during the writing operation.

Accordingly, the object of this invention is to provide an improved method and improved apparatus for digital recording in which the signal to noise ratio is high.

A further object of this invention is to increase the accuracy and reliability of the digital recording technique by reducing the system sensitivity to defects in the magnetic recording medium.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

Figure 1:
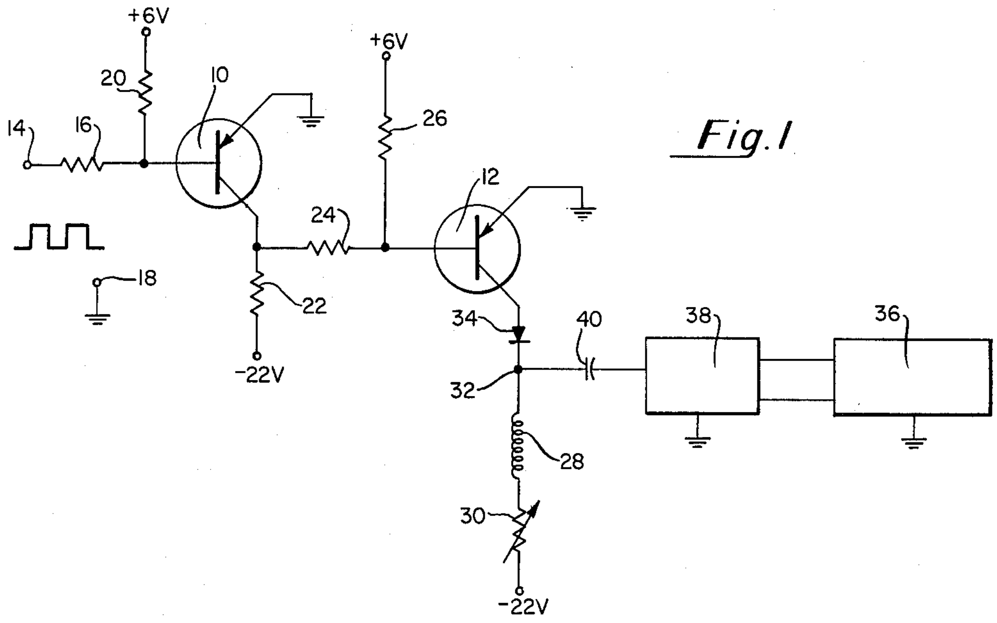
FIG. 1 is a simplified circuit diagram in accordance with the invention.

Referring now to FIG. 1, the simplified practical embodiment there shown comprises a pair of transistors 10, 12, arranged in the common emitter configuration. One of the input terminals 14 is connected to the base of transistor 10 through resistor 16, while the other input terminal 18 is grounded. Bias potentials for the base and collector of transistor 10 are supplied by means of resistors 20 and 22 respectively. The collector of transistor 10 is connected to the base of transistor 12 through resistor 24. Bias potential for the base of transistor 12 is applied through resistor 26.

The erase-write head is indicated by a coil 28, one end of which is connected to a resistor 30. The other end of the coil 28, identified by numeral 32, is connected to the collector of transistor 12 through a diode 34 with the polarity as indicated on the drawning. Bias potential (−22 v.) for the collector of transistor 12 is applied through the series path consisting of resistor 30, coil 28 and the diode 34.

A high frequency oscillator, shown at 36, is connected to a power amplifier 38. The ungrounded output terminal of amplifier 38 is connected to a point 32 through a capacitor 40.

During the erasing operation, the transistor 10 is conducting and transistor 12 is cut off. High frequency erase current from the amplifier 38 is applied to the write head 28; this current is of sufficient amplitude to saturate the magnetic medium in the region of the write head 28. As the magnetic medium is transported past the write head, it is driven successively through gradually diminishing hysteresis loop cycles causing demagnetization or erasure of the medium. The high frequency current is selected to have a recorded wavelength λ equal to or less than the width of the air gap of the read-head, so that erase frequency components which are recorded on the magnetic medium cannot be read back by the read-head. The overall erasing operation is therefore a combination of these effects. The recorded wave length λ is calculated from the relationship:

$$\lambda=\frac{v_m}{f}$$

where

λ=the recorded wave length in inches.

$v_m$=the velocity of the magnetic medium past the read head in inches per second.

$f$=the frequency of the erase current in cycles per second.

During the write operation, write signal pulses from the control logic are applied at input terminals 14, 18. These positive going pulses applied to the base of transistor 10, cause it to cut off. The negative going pulses at the collector of transistor 10 are applied to the base of transistor 12, causing conduction of transistor 12. The collector of transistor 12, and hence circuit point 32, is now substantially at ground potential, so that effectively the A.C. erase current is shunted through transistor 12 and diode 34. The collector supply voltage (−22 v.) is then applied across the components 28, 30, to ground for the duration of a write pulse.

In its broadest aspects, the invention contemplates using any convenient means to switch coil end 32 to ground when required for the writing operation.

In the embodiment here illustrated the diode 34 is used to prevent clipping of the erase signal waveform. The A.C. signal is superimposed on the D.C. level established by the collector supply voltage. Without the diode, there would be clipping of the A.C. signal as it went positive. The resulting unsymmetrical waveform would have a new D.C. level and this would have the undesirable effect of D.C. biasing the magnetic medium. The magnitude of the capacitor 40 is selected so that the capacitor will resonate with the coil 28. The resistor 30 controls the A.C. erase current and the D.C. write current.

Figure 2:
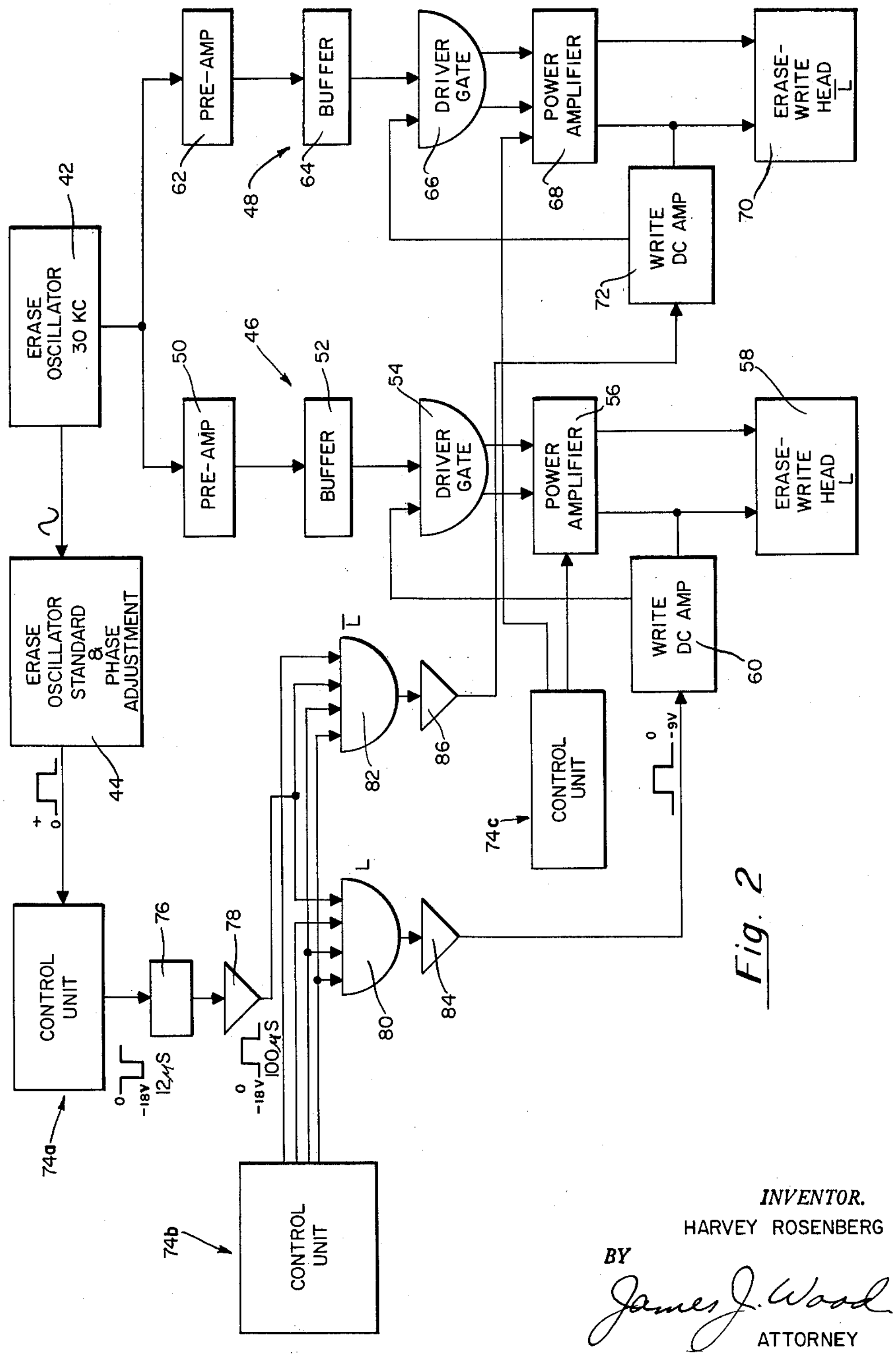
FIG. 2 is a block diagram of an illustrative embodiment of a digital recording system in accordance with the invention.

A block diagram of another illustrative embodiment of the invention is shown in FIG. 2. In the practical environment of this embodiment, the digital recording was done on two magnetic stripes affixed to the back of ledger cards, one stripe to record a binary "ZERO" and the other stripe to record a binary "ONE." For identification purpose, one stripe will be called ⌊ and the other $\overline{⌊}$.

A 30 kc. erase oscillator is shown at 42. The high frequency output of the oscillator is applied to an erase oscillator standard and phase adjustment 44, and to the signal channels associated with the ⌊ and $\overline{⌊}$ stripes. These channels are indicated generally at 46 and 48; since they are identical only one will be described in detail.

As concerns channel 46, the output of the oscillator 42 is fed to a pre-amplifier 50; the signal flow is then successively through a buffer 52, a driver gate 54, and a power amplifier 56, from where it is applied to the erase-write head 58. A write D.C. amplifier is indicated at 60; the output of this amplifier is fed to the erase-write head 58 and also to the driver gate 54.

Similarly channel 48 contains corresponding components which are numbered 62, 64, 66, 68, 70, and 72.

The output of the erase oscillator standard 44 is applied to a control unit, indicated generally at 74*a*, of a computer. From the control unit 74*a* a signal is then applied to a multivibrator 76, the output of which is then passed through an inverter 78. The inverter output is then applied to AND gates 80, 82, one for each channel ⌊ and $\overline{⌊}$. The gate outputs are then fed to inverters 84, 86, respectively. The output of inverter 84 is fed to D.C. write amplifier 60, while the output of inverter 86 is fed to D.C. write amplifier 72.

In operation of the apparatus, the erase oscillator sends erasing high frequency current through channels 46 and 48 to erase-write heads 58 and 70 respectively. Both stripes are erased simultaneously.

The output of the oscillator 42 is applied to erase oscillator standard 44 which develops a signal which is sent to the control unit 74*a*. The erasing high frequency signal at the erase-write head is monitored, and depending upon the application under consideration, the phase of the square wave output pulse of the standard 44 is adjusted so that its leading edge is begun at a predetermined time in the interval of the sine wave of high frequency current from 90 to 270 electrical degrees. In one practical embodiment, the signal is obtained when the high frequency current has passed through 180 electrical degrees. The 30 kc. signal from the standard is fed to the control unit 74*a* where it emerges as a 3.75 kc. signal pulse of 12 μsecond time width. The signal is then applied to a multivibrator 76 where it is stretched to a time width of 100 μseconds with a repetition rate of 3 kc. The signal is next inverted by inverter 78, and applied as an input to AND gates 80, 82, respectively.

The AND gates 80, 82, are under the discipline of the control unit 74*b*; this unit feeds a number of D.C. levels to gates 80 and 82 and determines which gate will be opened. Assuming that gate 80 for the ⌊ stripe is opened, the gated output is applied to inverter 84, and then to D.C. write amplifier 60. The amplifier 60 then delivers a write signal to erase-write head 58, and at the same time sends a signal to driver gate 54 which inhibits this gate, thus blocking the high frequency erase current from entering the erase-write head. The erasing and writing operations are thus synchronized in time and are carried out as discrete steps.

Figure 3:
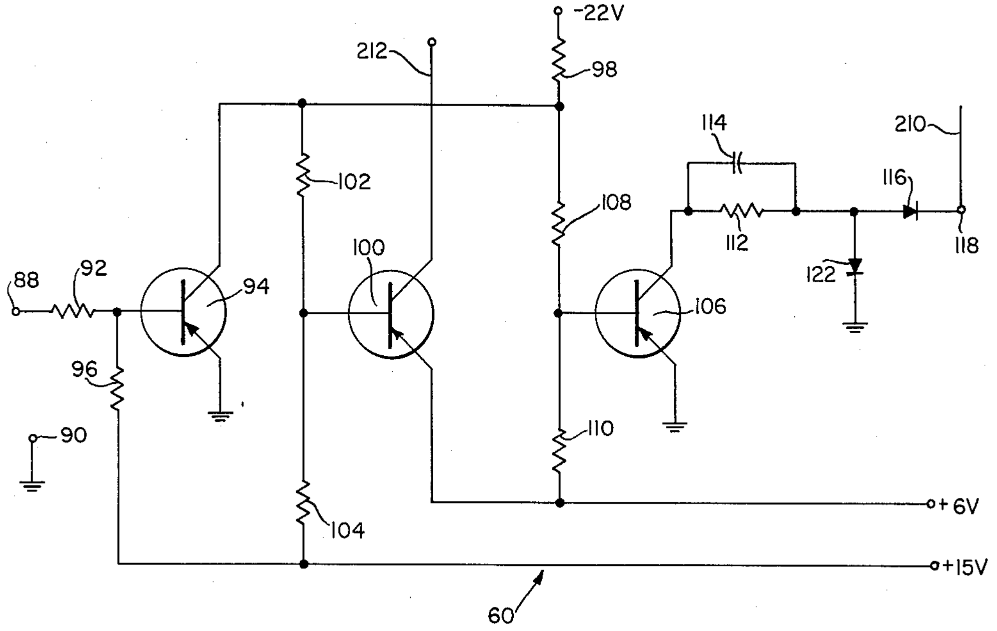
FIG. 3 is a circuit diagram of a D.C. write amplifier utilized in the embodiment of FIG. 2.

In FIG. 3 there is shown one of the D.C. write amplifiers used in the illustrative embodiment of FIG. 2. A pair of input terminals are shown at 88, 90. The input signal is applied to the base of a transistor 94 through a resistor 92. The transistor 94 is arranged in the common emitter configuration; bias potentials for the base and collector are applied through resistors 96 and 98 respectively.

Transistor 100 is arranged in the common emitter configuration, the emitter being connected to a source of positive battery. Resistors 102 and 104 are arranged in series, their common point being connected to the base of transistor 100 while the other ends are connected respectively to the collector of transistor 94 and to a source of positive battery as shown.

Transistor 106 is also arranged in the common-emitter configuration with the emitter being grounded. Resistors 108, 110 are connected in series, the common point being connected to the base of transistor 106, the outer ends being connected between the collector of transistor 94 and a source of positive battery as shown. A resistor 112 and a capacitor 114 are connected in parallel, the combination being connected in series with the collector of transistor 106. A diode 116 is also connected between output terminal 118 and the R-C combination 112, 114, the cathode of the diode being connected to output terminal 118. Another diode 122 is connected between the anode side of diode 116 and ground.

Figure 4:
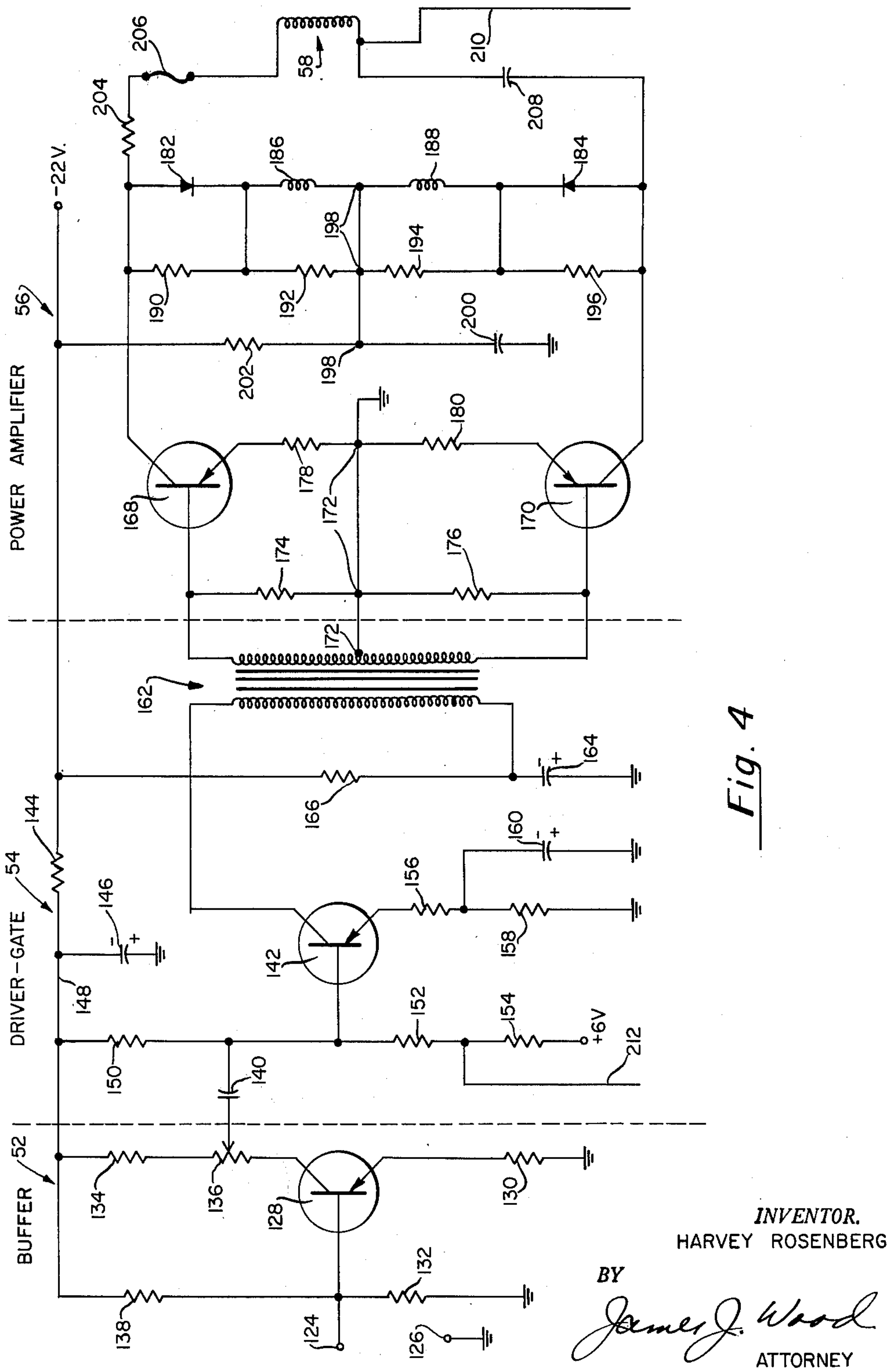
FIG. 4 is a circuit diagram of a buffer, driver-gate, power amplifier, and an erase-write head utilized in the illustrative embodiment of FIG. 2.

The buffer, driver gate and the power amplifier are combined in the single circuit shown in FIG. 4. The input to this combination is applied at terminals 124, 126. Terminal 124 is connected to the base of a transistor 128 arranged in the common emitter configuration. The emitter is connected to ground through resistor 130. The input to the transistor 128 is developed across resistor 132 which is connected between the input terminal 124 and ground. Bias potentials for the base and collector of transistor 128 are applied through common resistor 144, and through resistor 138 and resistor 134 and potentiometer 136 respectively.

The current of transistor 128 is coupled to the base of a transistor 142 through a capacitor 140 which is connected at one side to the sliding contact of potentiometer 136. The source of negative potential for the apparatus, i.e. −22 v., is connected in series with common resistor 144 and an electrolytic capacitor 146 with the polarity of the capacitor as shown. The negative side of the capacitor is identified with the numeral 148. The capacitor 140 is connected to point 148 through a resistor 150. The base of transistor 142 is connected to a source of positive battery through resistors 152, 154. The emitter of transistor 142 is connected to ground through resistors 156, 158; the latter resistor is shunted by an electrolytic capacitor 160.

A transformer indicated generally at 162, has one side of its primary connected to the collector of transistor 142, the other side being connected to ground through electrolytic capacitor 164, the positive side of which is grounded. The negative side of capacitor 164 is connected to the negative battery source through resistor 166.

The secondary of the transformer 162 is connected to a pair of transistors 168, 170 operated as class B push-pull amplifiers; the transformer secondary is grounded at the mid-point 172. Resistors 174, 176 are connected between the respective base of transistors 168 and 170 and the grounded point 172. Similarly resistors 178, 180 are connected respectively between the emitters of the transistors 168, 170 and the grounded point 172.

A symmetrical network is connected between the respective collectors of transistors 168 and 170: diodes 182 and 184 are arranged in series with inductances 186, 188, the anodes of the diodes being connected to the collectors. In addition, each of these enumerated components is shunted by a resistor: diode 182 is shunted by resistor 190, inductance 186 is shunted by resistor 192, inductance 188 is shunted by resistor 194 and diode 184 is shunted by resistor 196. The center point of this symmetrical network will be identified by the numeral 198; this common point 198 is returned to ground through the combination of a capacitor 200 in parallel with a resistor 202 and the negative supply voltage (−22 v.). The collector of transistor 168 is also connected to the erase-write head 58 through a resistor 204 and a fuse 206. The collector of transistor 170 is connected to the other side of the erase-write head 58 through a capacitor 208.

Signals from the $\llcorner$ stripe D.C. write amplifier 60 are applied to the erase-write head 58 through connection 210. The D.C. write amplifier 60 also sends signals to the driver gate through connection 212. (Duplicate equipment of course is provided for $\overline{\llcorner}$ stripe operations.)

The operation of the circuitry will now be described in connection with the mechanization of banking problems. More specifically, attention will be focused on the problem of erasing and writing binary information, in code, on a pair of magnetic stripes or tracks which have been placed on the back of the ledger cards. Actually, of course, the technique may be utilized in erase-write operations on any magnetic medium.

When the control unit 74*c* determines that an erase-write operation is to take place, the negative supply −22 v. is connected to the circuitry of FIG. 4. This enables the high frequency erase currents to reach the erase-write head 58 (FIG. 4).

The erase oscillator 42 (FIG. 2) sends high frequency signals (30 kc.) to the channels 46 and 48. In the interests of clarity, consideration will be given only to the channel associated with the $\llcorner$ stripe, but it will be understood that the erase signals are applied simultaneously to both stripes $\llcorner$ and $\overline{\llcorner}$.

The high frequency signals are applied to the preamplifier 50 (FIG. 2) the output of which is then applied to buffer 52 (FIGS. 2 and 4). From the buffer 52 the signal is then applied to the driver-gate 54, the output of which is the secondary of the transformer 162 (FIG. 4). The input to the power amplifier 56 is developed across the secondary of transformer 162.

The ends of the secondary of transformer 162 swing alternately positively and negatively about the grounded mid-tap 172. These cyclic signals applied to the bases of the transistors 168, 170, cause them to be alternately conducting and cut off.

When the transistor 168 is conducting, the collector current may be traced in two paths: first, a main path from ground through resistor 178, resistor 204, erase-write head 58, capacitor 208, diode 184, inductance 188, resistor 202 and through the negative supply to ground. The other path may be traced: from ground, resistor 178, diode 182, inductance 186 through resistor 202 and return to ground through the negative potential supply.

When the transistor 170 is conducting, the collector current may be traced in two paths: first, the main path from ground through resistor 180, capacitor 208, erase-write head 58, resistor 204, diode 182, inductance 186, resistor 202 and return to ground through the negative potential supply. The second path is traced from ground through resistor 180, diode 184, inductance 188, resistor 202 and return to ground through the negative potential supply.

Thus the erase-write head 58 experiences an alternating signal which effectively erases the information on the magnetic medium.

The writing operation will now be described. Briefly, in review, the erase oscillator 42 sends high frequency (30 kc.) signals to the erase standard 44 which develops a signal which will ultimately be used in providing synchronization of the erase and write operations. The signal developed is a square pulse pulse whose leading edge is positioned on the time scale at a predetermined instant in the interval when the sine wave of high frequency oscillator current in the erase head has passed through 90 to 270 electrical degrees. In one practical embodiment this predetermined selected time was the instant when the sine wave traversed 180 electrical degrees.

The signal from the standard 44 is next applied to the control unit 74*a* where it undergoes a reduction in frequency, i.e., to 3.75 kc. The signal is then passed to a multivibrator 76 which serves to reduce the repetition rate further to 3 kc., and also to stretch the pulse width from 12 μseconds to 100 μseconds. The multivibrator signal is next passed to an inverter 78 where it is inverted and then applied to both gates 80, 82, for the $\llcorner$ and $\overline{\llcorner}$ stripes respectively.

The gates 80, 82 are AND gates and therefore they will not be enabled without the presence of signals on all its inputs, including the synchronized signal from the inverter 78. The control unit 74*b* applies D.C. levels to the gates 80, 82, and thus determines which gate will be operated. Assume that the $\llcorner$ gate is operated, then the gated signal is applied to an inverter 84 and to the input of the D.C. write amplifier 60.

The D.C. write amplifier 60 is shown in detail in FIG. 3 (the circuitry is identical for both the $\lfloor$ and $\overline{\lfloor}$ write amplifiers). The transistor 94 is normally ON, while transistors 100 and 106 are normally OFF. The application of the positive going signal to the base of transistor 94 causes it to cut off. The collector output of transistor 94 is then applied to the base of transistor 100, causing it to conduct, and the resulting positive going pulse developed at its collector is applied by means of connector 212 and ground, to the base of transistor 142 (FIG. 4) causing it to cut off, thus inhibiting the driver gate 54 and terminating the erasing operation.

The negative going pulse developed at the collector of transistor 94 is also applied to the base of transistor 106, turning this transistor ON.

The collector pulse of transistor 106 is then applied to the erase-write head 58. The write current pulse may be traced: from ground, through transistor 106, through the parallel RC circuit 112, 114, through diode 116, connector 210, through the erase-write head 58, resistor 204, diode 182, inductance 186, resistor 202 and return to ground through the negative potential supply.

Completing the description of FIG. 3, the capacitor 114 is used to speed up the rise time of the collector pulse. The diodes 116, 122, are blocking diodes used to prevent positive and negative spike voltages from reaching the collector of transistor 106. The diode 122 is a Zener diode which clamps or limits the voltage to the order of magnitude of about −80 v.

Obviously many modifications and variations of the present invention are possible in the light of the above teachings. It is therefore to be understood that within the scope of the appended claims the invention may be practiced other than as specifically described and illustrated.

What is claimed is:

1. The method of digital recording on a magnetic medium comprising the steps of applying a high frequency erase current to an electromagnetic erase-write head member, the high frequency erase current having a recorded wavelength on said magnetic median equal to or smaller than the air gap in a readback electromagnetic head member, and then applying a D.C. write signal to the erase-write head member in synchronized relationship with the erase current while simultaneously blocking the passage of said high frequency erase current, said synchronized relationship occurring at the instant in time when the sine wave of high frequency current has passed through the interval from 90 to 270 electrical degrees.

2. Apparatus for digital recording on a magnetic medium, comprising in combination, gating means, means for generating a high frequency electric current connected to the input of said gating means, an electromagnetic erase-write head member, amplifying means connecting the output of said gating means with the said erase-write head member, D.C. signal means electrically connected in an operative sense to said erase-write head and to said gating means for synchronously applying a direct current signal to said erase-write head member to write a binary bit on said medium, and for inhibiting said gating means during the writing operation.

3. Apparatus for digital recording on a magnetic medium comprising, in combination, inhibit gating means having an output and an input, means for generating a high frequency erasing current connected to the input of said inhibit gating means, an electromagnetic erase-write head member, amplifying means connecting the output of said inhibit gating means with said electromagnetic erase-write head member, D.C. write signal means operatively connected to the input of said inhibit gating means for supplying an inhibit signal thereto during the writing operation, control gating means, for determining the initiation of the write operation, connected to said D.C. write signal means, synchronizing means coupled to the input of said control gating means for providing one enabling signal to said control gating means each time said high frequency current in the erase-write head has passed through 180 electrical degrees.

4. Apparatus for digital recording on a plurality of magnetic channels, comprising in combination, a plurality of gating means, each having an input and an output, one gating means for each channel, means for generating a high frequency erasing current connected to the input of each of said gating means, a plurality of electromagnetic erase-write head members, one head member for each magnetic channel, a plurality of amplifying means, one for each channel, each connecting the output of one of said plurality of gating means with the one of said plurality of erase-write electromagnetic head members respectively, a plurality of D.C. signal means each electrically connected to one of said plurality of erase-write head members and to one of said plurality of gating means for applying a direct current to a respective head member in complementary fashion to write a binary bit on its associated magnetic channel, and for inhibiting a respective gating means during the writing operation to thereby block the passage of said high frequency erasing current.

5. Digital recording apparatus for writing and erasing operations on a magnetic medium, comprising in combination, an electromagnetic erase-write head including an inductance member, an adjustable resistor in series with one end of said inductance member, the free end of said adjustable resistor being adapted for connection to a D.C. signal source, capacitive means having first and second plates, being selected to resonate with said inductance member, the said other end of the inductance member being connected to the first plate of said capacitive means, means for generating a high frequency electric current connected to the second plate of said capacitive means, and control means for bringing said other end of the inductance member to ground potential during the writing operation.

6. Digital recording apparatus according to claim 5 in which said control means comprises a transistor having three electrodes arranged with one electrode electrically common to the other two, and a unidirectional current device connected in series with one of the non-common electrodes of the transistor and to the said other end of the inductance member, the remaining electrode of the transistor and the common electrode serving to receive an input during the write operation.

7. Digital recording apparatus according to claim 5 in which said high frequency current has a recorded wavelength on said magnetic medium equal to or less than the length of the air gap of a readback electromagnetic head member.

8. Digital recording apparatus according to claim 5 in which said control means comprises an amplifying device, and a unidirectional current device electrically in series with said amplifying device and connected to the said other end of the inductance member.

9. Digital recording apparatus according to claim 5 in which said high frequency current has a recorded wavelength on said magnetic medium equal to or less than the length of the air gap of a readback electromagnetic head member.

10. The method of digital recording on a magnetic medium comprising the steps of applying a high frequency erase current to an electromagnetic erase-write head member, and then applying a D.C. write signal to the erase-write head member in synchronized, predetermined, relationship with said high frequency current while simultaneously blocking the passage of said high frequency erase current in order to record a binary bit on the medium, said synchronized relationship occurring at a predetermined instant in time when the sine wave of high frequency current has passed through the interval from 90 to 270 electrical degrees.

References Cited in the file of this patent

UNITED STATES PATENTS

| | | |
|---|---|---|
| 1,886,616 | Alverson | Nov. 8, 1932 |
| 2,513,683 | Shaper et al. | July 4, 1950 |
| 2,620,403 | Howey | Dec. 2, 1952 |
| 2,804,506 | Schurch | Aug. 27, 1957 |
| 2,894,796 | Reynolds | July 14, 1959 |

FOREIGN PATENTS

| | | |
|---|---|---|
| 776,401 | Great Britain | June 5, 1957 |